United States Patent
Parthasarathy et al.

(10) Patent No.: US 10,423,350 B2
(45) Date of Patent: Sep. 24, 2019

(54) PARTIALLY WRITTEN BLOCK TREATMENT

(71) Applicant: Micron Technology, Inc., Boise, ID (US)

(72) Inventors: Sivagnanam Parthasarathy, Carlsbad, CA (US); Terry M. Grunzke, Boise, ID (US); Lucia Botticchio, Pescina (IT); Walter Di Francesco, Avezzano (IT); Vamshi K. Indavarapu, San Jose, CA (US); Gianfranco Valeri, Pescina (IT); Renato C. Padilla, Folsom, CA (US); Ali Mohammadzadeh, Mountain View, CA (US); Jung Sheng Hoei, Newark, CA (US); Luca De Santis, Avezzano (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/532,886

(22) PCT Filed: Jan. 23, 2017

(86) PCT No.: PCT/US2017/014535
§ 371 (c)(1),
(2) Date: Jun. 2, 2017

(87) PCT Pub. No.: WO2018/136094
PCT Pub. Date: Jul. 26, 2018

(65) Prior Publication Data
US 2018/0210653 A1 Jul. 26, 2018

(51) Int. Cl.
G06F 3/06 (2006.01)
G06F 12/02 (2006.01)
G06F 12/1009 (2016.01)

(52) U.S. Cl.
CPC ............ G06F 3/064 (2013.01); G06F 3/0611 (2013.01); G06F 3/0659 (2013.01);
(Continued)

(58) Field of Classification Search
CPC ...... G06F 3/0611; G06F 3/064; G06F 3/0659; G06F 3/0679; G06F 3/0688;
(Continued)

(56) References Cited

U.S. PATENT DOCUMENTS 7,907,463 B2 3/2011 Edahiro et al.
8,599,619 B2 12/2013 Fukuda
(Continued)

FOREIGN PATENT DOCUMENTS

| JP | 2009301616 | 12/2009 |
| JP | 2010040109 | 2/2010 |
| JP | 2012069192 | 4/2012 |

OTHER PUBLICATIONS

International Search Report and Written Opinion for related PCT Application No. PCT/US2017/014535, dated Oct. 19, 2017, 16 pages.

(Continued)

*Primary Examiner* — Aracelis Ruiz
(74) *Attorney, Agent, or Firm* — Brooks, Cameron & Huebsch, PLLC (57) ABSTRACT

The present disclosure relates to partially written block treatment. An example method comprises maintaining, internal to a memory device, a status of a last written page corresponding to a partially written block. Responsive to receiving, from a controller, a read request to a page of the partially written block, the example method can include determining, from page map information maintained internal to the memory device and from the status of the last written page, which of a number of different read trim sets to use to read the page of the partially written block corresponding to the read request.

21 Claims, 5 Drawing Sheets

(52) U.S. Cl.
CPC .......... G06F 3/0679 (2013.01); G06F 3/0688 (2013.01); G06F 12/0246 (2013.01); G06F 12/1009 (2013.01); *G06F 2212/1021* (2013.01); *G06F 2212/2022* (2013.01); *G06F 2212/7201* (2013.01)

(58) Field of Classification Search
CPC ............. G06F 12/0246; G06F 12/1009; G06F 2212/1021; G06F 2212/2022; G06F 2212/7201
See application file for complete search history.

(56) References Cited

U.S. PATENT DOCUMENTS

| | | | |
|---|---|---|---|
| 9,164,830 B2 | 10/2015 | Kankani et al. | |
| 9,208,888 B1* | 12/2015 | Wakchaure | G11C 16/26 |
| 9,236,133 B2 | 1/2016 | Yanamanamanda et al. | |
| 2010/0037007 A1 | 2/2010 | Futatsuyama et al. | |
| 2011/0102636 A1* | 5/2011 | Kamphenkel | G06F 12/0246 |
| | | | 365/185.03 |
| 2013/0051148 A1 | 2/2013 | Lee et al. | |
| 2013/0073786 A1 | 3/2013 | Hanmant et al. | |
| 2013/0343125 A1 | 12/2013 | Gillingham et al. | |
| 2015/0227314 A1 | 8/2015 | Chen et al. | |
| 2015/0356022 A1* | 12/2015 | Leidel | G06F 12/1009 |
| | | | 711/207 |
| 2016/0141046 A1* | 5/2016 | Khandelwal | G11C 16/3427 |
| | | | 365/185.02 |

OTHER PUBLICATIONS

Extended European Search Report and Written Opinion for related EP Application No. 17892491.6, dated Jan. 17, 2019, 7 pages.
Notice of Rejection for related Japan Patent Application No. 2017-544330, dated Mar. 19, 2019, 11 pages.
Notice of Rejection for related Japan Patent Application No. 2017-544330, dated Jun. 4, 2019, 12 pages.

* cited by examiner

| TYPE | READ TRIM |
|---|---|
| SLC | T1 |
| | T2 |
| MLC1 | T3 |
| | T4 |
| | T5 |
| MLC2 | T6 |
| | T7 |
| | T8 |
| MLC3 | T9 |
| | T10 |
| | T11 |

PARTIALLY WRITTEN BLOCK TREATMENT

This application is a National Stage application under 35 U.S.C. 371 of PCT/US2017/014535, filed Jan. 23, 2017.

TECHNICAL FIELD

The present disclosure relates generally to semiconductor memory and methods, and more particularly, to partially written block treatment.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory devices can be combined together to form a storage volume of a memory system such as a solid state drive (SSD). A solid state drive can include non-volatile memory (e.g., NAND flash memory and NOR flash memory), and/or can include volatile memory (e.g., DRAM and SRAM), among various other types of non-volatile and volatile memory.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives.

Data being written to memory cells can affect previously written data (e.g., via cell to cell interference). Accordingly, the charge corresponding to a programmed cell can be affected by whether or not neighboring cells have been programmed and/or by the particular programmed states of neighboring cells. Adjusting read parameters based on the program states of neighboring cells can provide benefits such as reducing bit error rates and/or reducing latency by preventing read re-tries (e.g., corrective reads), among various other benefits.

DETAILED DESCRIPTION

The present disclosure relates to partially written block treatment. An example method comprises maintaining, internal to a memory device, a status of a last written page corresponding to a partially written block. Responsive to receiving, from a controller, a read request to a page of the partially written block, the example method can include determining, from page map information maintained internal to the memory device and from the status of the last written page, which of a number of different read trim sets to use to read the page of the partially written block corresponding to the read request.

A number of embodiments of the present disclosure can provide benefits such as improving read performance of partially written blocks, as compared to prior approaches. For instance, treatment of partially written blocks in accordance with embodiments described herein can reduce uncorrectable bit error rates (UBERs), reduce the number of corrective reads, and also reduce complexity associated with system controllers (e.g., SSD controllers), among various other benefits. As described further herein, a partially written block refers to a physical block of memory configured to store a plurality of pages (e.g., logical pages) of data and which has not been fully written. In such cases, it can be useful to treat the last written page (e.g., the most recently written page) differently than previously written pages. For example, as described in association with FIGS. 3 and 4, the last written page may not belong to fully programmed cells (e.g., the cells storing the last written page may be configured to store three logical pages of data with the last written page corresponding to the first or second logical page). As one example, and as described in FIG. 4, the cells may be programmed via a two-pass programming process that comprises a first programming pass in which a lower page (LP) and a middle page (MP) are programmed to a group of memory cells, and a second programming pass in which an upper page (UP) is programmed to the group of cells. Additionally, the cells storing a last written page of a partially written block do not experience as much cell to cell interference (e.g., due to programming of neighboring cells) as cells storing previously written pages. Therefore, using the same read trim set (e.g., read voltage levels) to perform a read of a last written page of a partially written block as is used to perform a read of other pages can result in more read errors of the last written pages.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of memory devices can refer to one or more memory devices. Additionally, the designators "N", "B", "R", and "S" as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

Figure 1:
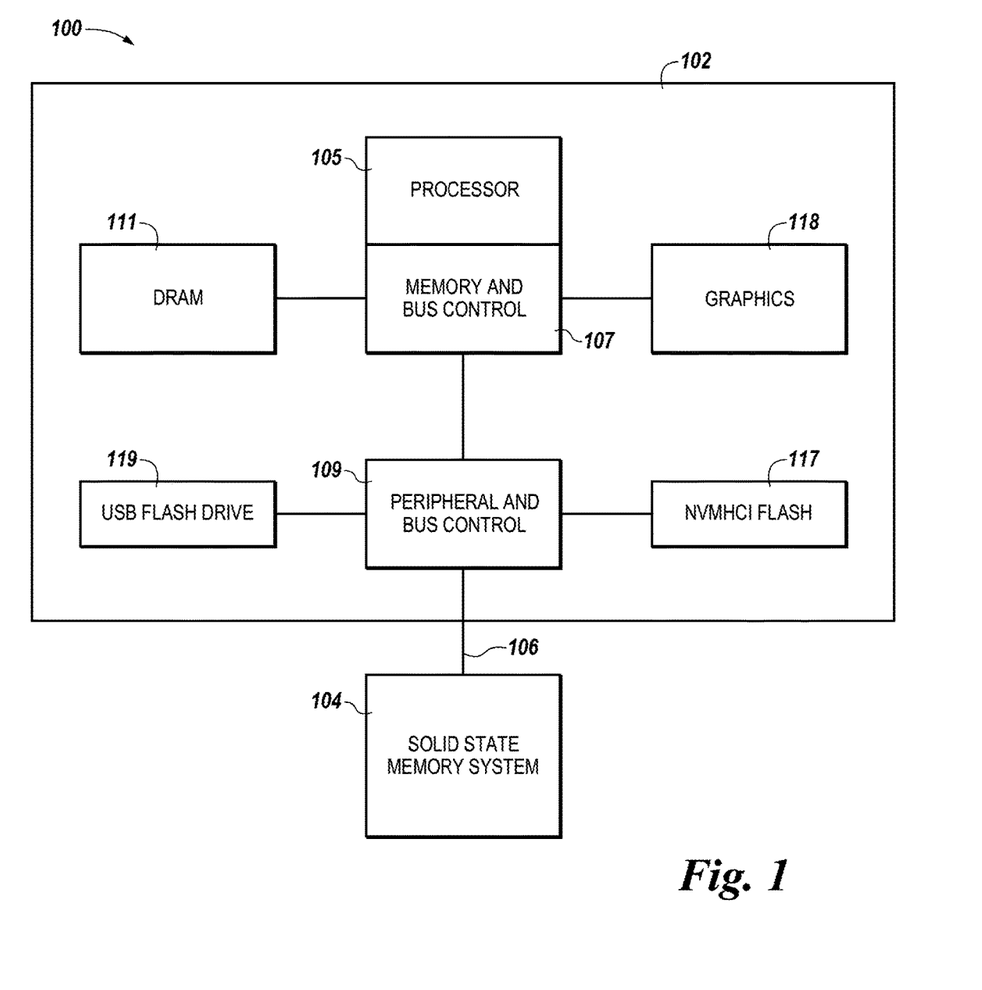
FIG. 1 is a block diagram of an apparatus in the form of a computing system including at least one memory system in accordance a number of embodiments of the present disclosure.

FIG. 1 is a block diagram of an apparatus in the form of a computing system 100 including at least one memory system 104 in accordance a number of embodiments of the present disclosure. As used herein, a memory system 104, a system controller (e.g., 215), a memory device (e.g., 210), or a device controller (e.g., 225) might also be separately considered an "apparatus".

Computing system 100 includes a memory system 104 coupled to a host 102 through an interface 106. As used herein, "coupled to" generally refers to a connection between components, which may be an indirect communicative connection or direct communicative connection (e.g., without intervening components), whether wired or wireless, including connections such as, electrical, optical, magnetic, etc. The memory system 104 can be a solid state storage appliance implemented using a number of SSDs, for example. As described further in association with FIG. 2, the system 104 can include a system controller (e.g., 215) coupled to a memory (e.g., a number of memory devices 210-1, ..., 210-N) via a suitable memory interface (e.g., 208).

Example hosts 102 can include laptop computers, personal computers, digital cameras, digital recording and playback devices, mobile telephones, PDAs (personal digital assistants), memory card readers, and interface hubs, among other host systems. The interface 106 can include a serial advanced technology attachment (SATA), peripheral component interconnect express (PCIe), or a universal serial bus (USB), among other connectors and interfaces. In general, however, host interface 106 can provide an interface for passing control, address, data, and other signals between the memory system 104 and the host 102.

Host 102 can include a number of processors 105 (e.g., parallel processors, co-processors, etc.) coupled to a memory and bus control 107. The processor 105 can be a number of microprocessors, or some other type of controlling circuitry, such as a number of application-specific integrated circuits (ASICs), for example. Other components of the computing system 100 may also have processors. The memory and bus control 107 can have memory and/or other components coupled thereto. In this example, memory and bus control 107 is coupled to a dynamic random access memory (DRAM) 11, a graphic user interface 118, and a peripheral and bus control 109. In this example, peripheral and bus control 109 is coupled to a flash drive 119 via a universal serial bus (USB) interface, a non-volatile memory host control interface (NVMHCI) flash memory 117, and the memory system 104. The memory system 104 can be used in addition to, or in lieu of, a hard disk drive (HDD) in a number of different computing systems. The computing system 100 illustrated in FIG. 1 is one example of such a system; however, embodiments of the present disclosure are not limited to the configuration shown in FIG. 1.

Figure 2:
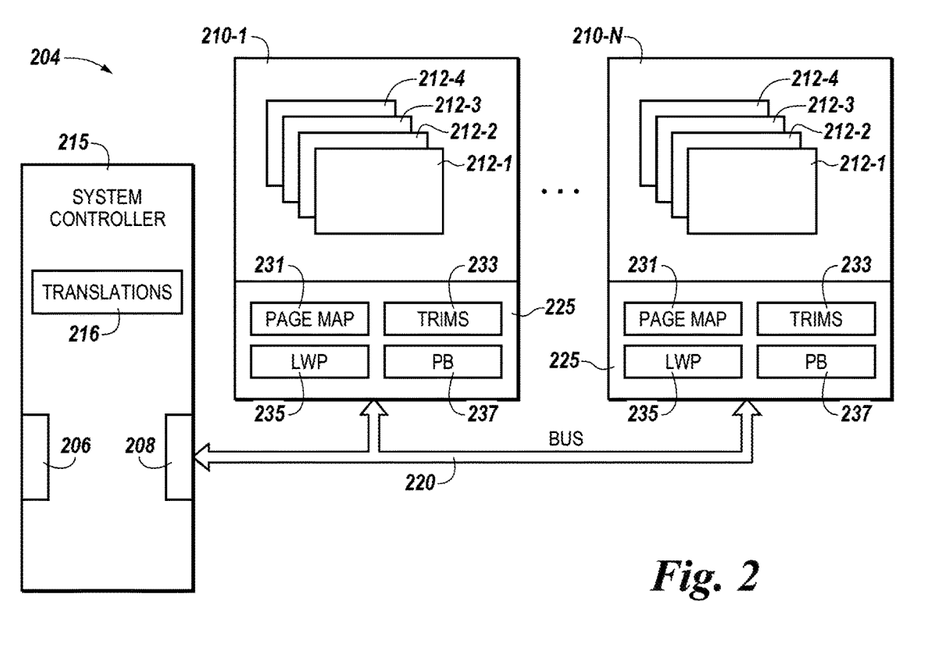
FIG. 2 is a block diagram of an apparatus in the form of a memory system configured to perform partially written block treatment in accordance with a number of embodiments of the present disclosure.

FIG. 2 is a block diagram of an apparatus in the form of a memory system 204 configured to perform partially written block treatment in accordance with a number of embodiments of the present disclosure. As one example, the memory system 204 can be a solid state drive (SSD). The memory system 204 includes a memory system controller 215 (e.g., memory control circuitry, firmware, and/or software) coupled to a memory (e.g., a number of memory devices 210-1, ..., 210-N) via a bus 220. The memory devices 210-1, ..., 210-N may be referred to collectively as memory devices 210 or as memory 210.

The system controller 215 includes a host interface 206 for communication with a host such as host 102 described in FIG. 1, and a device interface 208 for communication with the memory devices 210 via a bus 220. The bus 220 can send/receive various signals (e.g., data signals, control signals, and/or address signals) between the memory devices 210 and the system controller 215. Although the example illustrated in FIG. 2 includes a single bus 220, the memory system 204 can include a separate data bus (DQ bus), control bus, and address bus. The bus 220 can have various types of bus structures including, but not limited to, bus structures related to Open NAND Flash Interface (ONFI), Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI). The system controller 215 can be configured to support various data interface types associated with the memory devices 210 (e.g., NV-DDR, NV-DDR2, NV-DDR3, etc.).

The system controller 215 includes a translation component 216, which can be a flash translation layer (FTL), for example, associated with logical to physical address translation between the host and memory 210. For instance, the translation component 216 may include a mapping table of logical block addresses (LBAs) to physical block addresses (PBAs). Although not shown in FIG. 2, system controller might also include an error detection and/or correction component, a wear leveling component, and/or a garbage collection component, among various other components implemented in hardware, firmware, and/or software and associated with management of memory 210.

As illustrated in FIG. 2, the memory devices 210 can include a number of memory units 212-1, 212-2, 212-3, and 212-4, which may be referred to collectively as memory units 212 and which provide a storage volume for the memory system 204. The memory units 212 can be dies or chips, which can be referred to as logical units (LUNs). For example, the memory devices 210 can be multi-chip packages (MCPs) that each include a number of dies 212. The dies 212 can be, for example, NAND dies comprising a number of arrays of NAND flash memory cells and associated peripheral circuitry (e.g., write circuitry, read circuitry, I/O circuitry, buffers, etc.).

As described further below in association with FIGS. 3 to 5, the arrays can be NAND flash arrays comprising single level cells (SLCs) configured to store a single data unit (e.g., one bit), and/or multilevel cells (MLCs) configured to store more than one data unit. Additionally, the cells can be programmable via various different programming processes, which can depend on the quantity of data units stored per cell; however, cells configured to store a particular quantity of data units (e.g., 2 bits, 3 bits, 4 bits, etc.) per cell can be programmable via different programming processes. For example, a 3-bit MLC might be programmable via a two-pass programming process (e.g., a 4-8 process in which a first programming pass places the threshold voltage of the cells from an erase state into one of four distributions based on a lower page and middle page data state and in which a second programming pass places the threshold voltage of the cells from the one of four distributions into one of eight distributions based on the upper page data state), or a three-pass programming process (e.g., a 2-4-8 process).

Embodiments of the present disclosure are not limited to the example shown in FIG. 2. For instance, memory systems in accordance with embodiments of the present disclosure can include more or fewer than four memory units (e.g., die) 212 per memory device (e.g., MCP) 210 and are not limited to a particular memory array architecture (e.g., NAND flash, NOR flash, DRAM, PCM, etc.). Also, although one controller 225 is shown per device 210, embodiments can include a controller per memory unit 212 (e.g., one controller per NAND die).

The memory devices 210 of system 204 include an internal device controller 225 configured to control operations (e.g., read, program, erase, etc.) performed on the memory units 212 (e.g., responsive to commands from system controller 215 and/or from a host via system controller 215). The controllers 225 are local to the memory devices 210 and can communicate with the external system controller 215 via bus 220. As shown in FIG. 2, the internal device controllers 225 can use internally stored page map information 231, trim information 233, last written page (LWP) information 235, and partially written block (PWB) information 237, which can be used in association with partially written page treatment in accordance with embodiments described herein. As an example, the information 231, 233, 235, and 237 can be stored (e.g., as tables) in memory located on controller 225 and/or in the arrays of memory units 212. In a number of embodiments, maintaining the information 231, 233, 235, and/or 237 local to memory devices 210 can provide various benefits such as reducing the involvement of the system controller 215 in association with effectively reading partially written blocks as compared to previous approaches. For example, various previous approaches might involve the system controller sending a read request to a partially written block, receiving an uncorrectable error, and then re-reading the page corresponding to the read request with an adjusted trim set (e.g., via a corrective read). Such corrective reads can adversely affect latency. Other previous approaches to treating partially written blocks might involve the system controller 215 tracking which blocks of memory 212 are partially written as well as the last written page of the block, and the status of neighboring pages, which can have drawbacks such as increasing the complexity of the system controller (e.g., due to large table sizes, etc.).

As an example, the page map information 231 can comprise a programming order of pages written to the blocks. The programming order can include page numbers and can be used to determine the location of a particular page corresponding to a read request with respect to the page last written to the block. The last written page information 235 can provide a status of pages last written to partially written blocks, which can include identifiers (e.g., page numbers) of the last written pages and may also indicate a completion status of the last written page (e.g., whether the page belongs to a group of partially programmed cells, or whether the page is fully programmed). The last written page information 235 can be maintained on a per block basis (e.g., such that it includes the last written page information corresponding to all the individual partially written blocks). The completion status of the last written page may also be determined (e.g., by the controller 225) based on the page number of the last written page and the page map information 231. The partially written block information 237 can provide identifiers (e.g., block numbers) of partially written blocks (e.g., those blocks not yet programmed to completion). The trim information 233 can include different trim sets used to read pages of data responsive to read requests. As an example, a first trim set may be used to read pages written to cells that are not adjacent to cells to which the last written page was written, a second trim set may be used to read pages written to cells adjacent to unwritten cells, and a third trim set may be used to read pages written to cells that are adjacent to partially written cells.

In operation, memory device 210 can receive a write command (e.g., from system controller 215) that results in a particular block being partially written. The memory device 210 can store, internally, an indication that the particular block is a partially written block as well as an indication of the last written page to the partially written block. Prior to the remainder of the particular block being written, the memory device 210 can receive a read request (e.g., from system controller 215), which can include a block identifier (e.g., a particular physical block address) and a page identifier (e.g., a physical page number) associated with a requested page of data. The memory device 210 (e.g., via internal controller 225) can compare the received block identifier to the partially written block information 237 to determine whether the read request corresponds to a partially written block. Responsive to determining that the block identifier matches (e.g., that the read request corresponds to a partially written block), the internally stored page map information 231 and internally stored last written page information 235 can be used (e.g., by the internal controller 225) to determine which particular trim set 233 to select for reading the requested page (e.g., the page corresponding to the read request). In a number of embodiments, the memory device 210 can execute the read request corresponding to the partially written block using the appropriate trim set without further interaction with the system controller 215.

In a number of embodiments, the system controller 215 is unaware of the status of the last written page corresponding to the partially written block when sending the read request to the memory device 210. For instance, the controller 215 can be unaware that the requested page is a last written page of a partially written block. The read request sent from controller 215 to memory device 210 can be responsive to a host-initiated read request corresponding to a particular LBA, and the controller 215 can translate (e.g., via translation component 216) the LBA to a physical block address prior to sending the read request to the device 210. In a number of embodiments, the controller 215 may be configured to maintain a "shadow" copy of partially written blocks and/or last written pages within partially written blocks (e.g., such that system controller 215 and internal controller 225 maintain such information). In a number of embodiments, the system controller 215 can issue a command to the memory device 210 to read partially written block and/or last written page information from the device 210, which may enable the information to persist across power cycles, for example.

Figure 3:
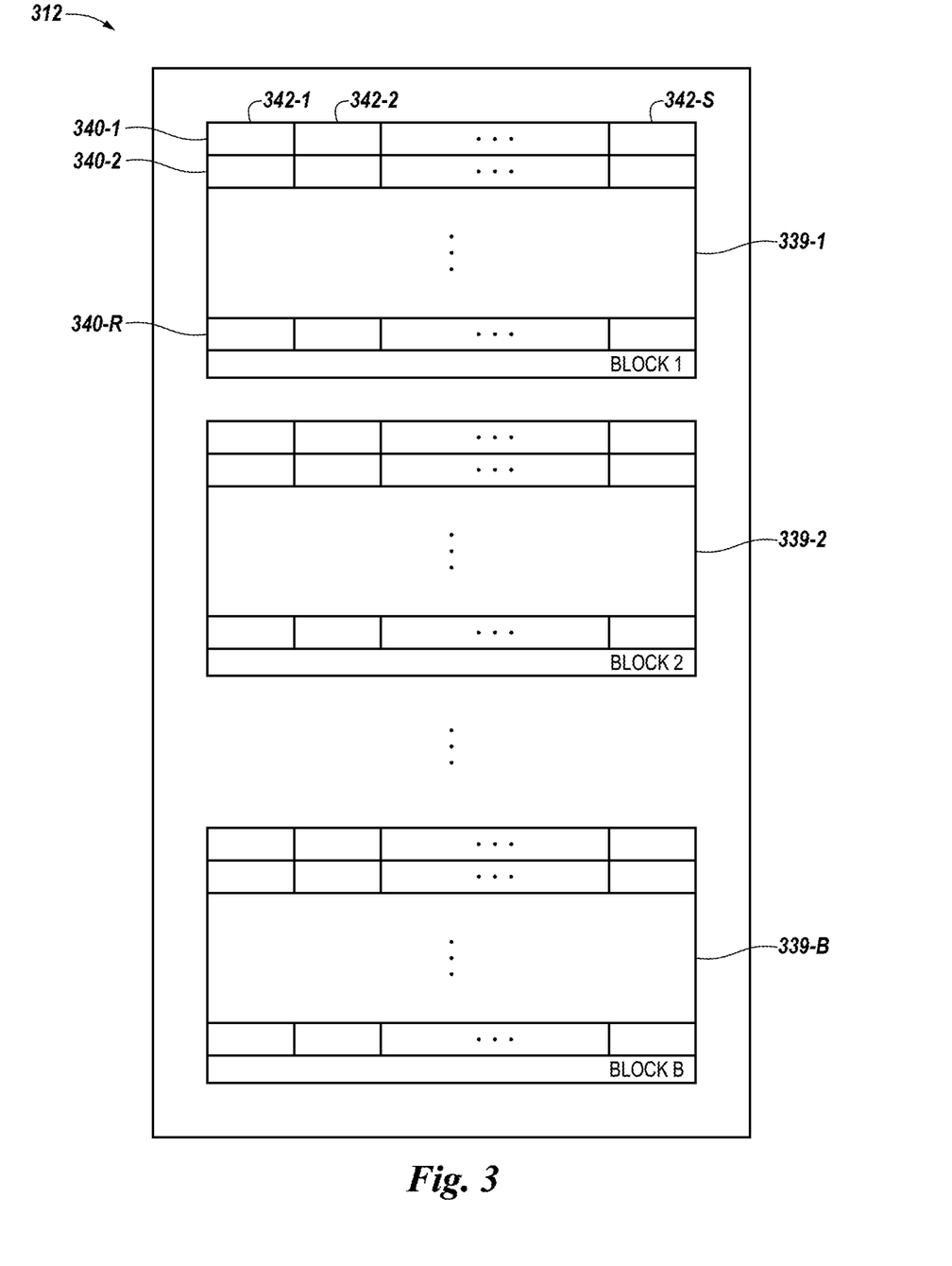
FIG. 3 illustrates an example of a memory unit having groups of memory cells organized as a number of physical blocks in accordance with a number of embodiments of the present disclosure.

FIG. 3 illustrates an example of a memory unit 312 having groups of memory cells organized as a number of physical blocks 339-1 (BLOCK 1), 339-2 (BLOCK 2), . . . , 339-B (BLOCK B), in accordance with a number of embodiments of the present disclosure. The memory unit 312 can be a memory unit such as memory units 212 described in FIG. 2. The memory cells of memory unit 312 can be, for example, non-volatile floating gate flash memory cells having a NAND architecture. However, embodiments of the present disclosure are not limited to a particular memory type.

The memory blocks 339-1, 339-2, . . . , 339-B can be referred to collectively as blocks 339 and can comprise SLC and/or MLC cells, for instance. As an example, the number of physical blocks in an array of memory unit 312 may be 128 blocks, 512 blocks, or 1,024 blocks, but embodiments are not limited to a particular number of physical blocks.

In the example shown in FIG. 3, each physical block 339 includes memory cells which can be erased together as a unit (e.g., the cells in each physical block can be erased in a substantially simultaneous manner as an erase unit). As shown in FIG. 3, each physical block 339 comprises a number of physical rows 340-1, 340-2, . . . , 340-R of memory cells that can each be coupled to a respective access line (e.g., word line). The number of rows in each physical block can be 32, 64, or 128, but embodiments are not limited to a particular number of rows, which can be referred to collectively as rows 340, per block 339.

As one of ordinary skill in the art will appreciate, each row 340 can comprise a number of physical pages of cells. A physical page of cells can refer to a number of memory cells that are programmed and/or read together or as a functional group. In the embodiment shown in FIG. 3, each row 340 can comprise one physical page of cells. However, embodiments of the present disclosure are not so limited. For instance, each row 340 can comprise multiple physical pages of cells (e.g., an even page associated with cells coupled to even-numbered bit lines, and an odd page associated with cells coupled to odd numbered bit lines). Additionally, as described further in association with FIG. 4, for embodiments including multilevel cells, a physical page can store multiple logical pages of data with each cell in a physical page contributing a bit toward a logical lower page, a bit toward a logical upper page, and one or more bits toward a respective number of logical intermediate pages.

In the example shown in FIG. 3, a physical page corresponding to a row 340 can store a number of sectors 342-1, 342-2, . . . , 342-S of data (e.g., an amount of data corresponding to a host sector, such as 512 bytes). The sectors 342 may comprise user data as well as overhead data, such as error correction code (ECC) data and logical block address (LBA) data. It is noted that other configurations for the physical blocks 339, rows 340, and sectors 342 are possible. For example, rows 340 can each store data corresponding to a single sector which can include, for example, more or less than 512 bytes of data.

Figure 4:
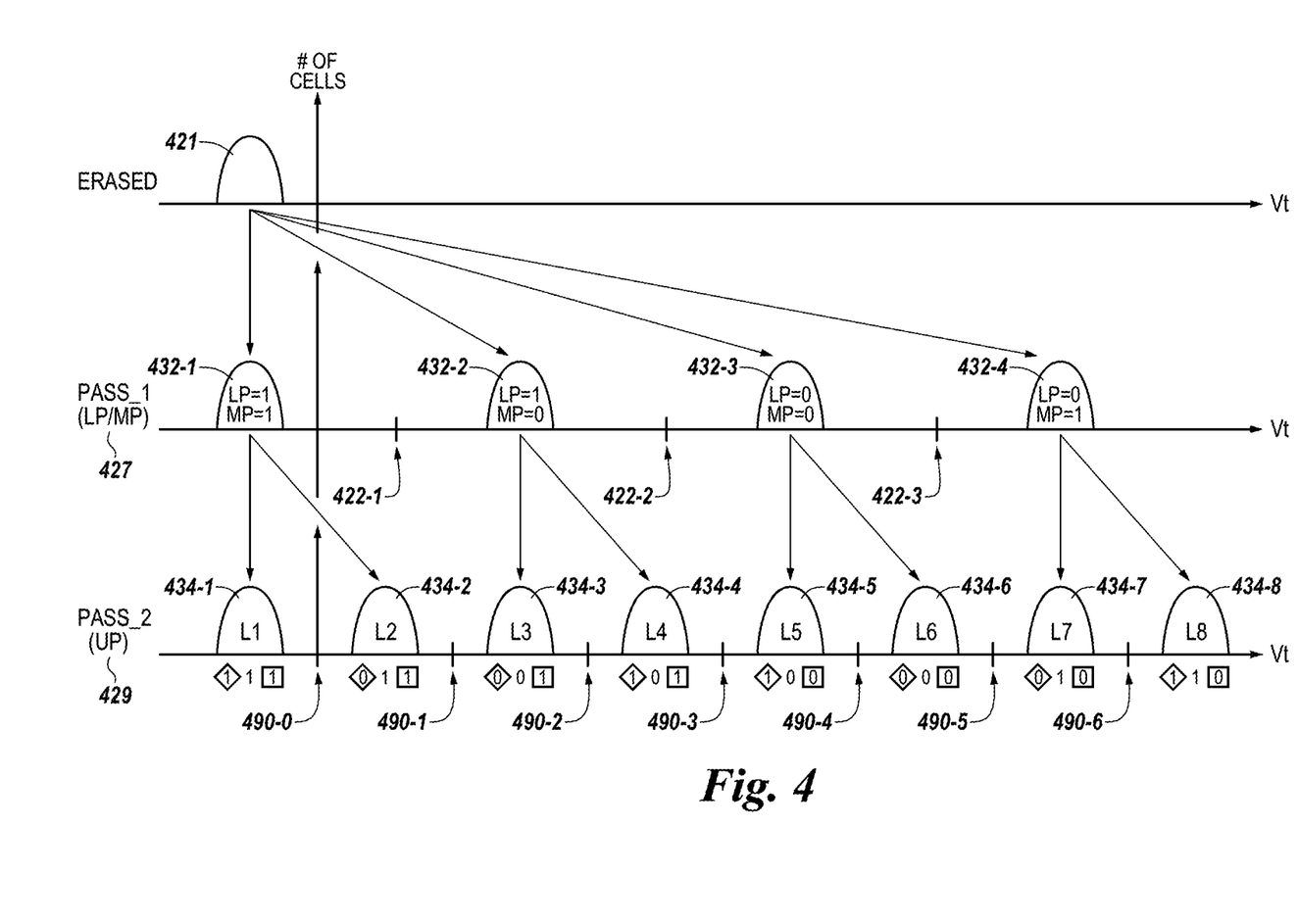
FIG. 4 illustrates a diagram associated with programming memory cells in accordance with a number of embodiments of the present disclosure

FIG. 4 illustrates a diagram associated with programming memory cells in accordance with a number of embodiments of the present disclosure. In this example, the memory cells are 3-bit MLCs each being programmable to one of eight data states (e.g., L1 to L8) assigned a different respective 3-bit bit pattern (e.g., 111, 011, 001, 101, 100, 000, 010, and 110). In a number of embodiments, each of the bits in the 3-bit stored bit patterns correspond to a different logical page of data. For instance, the least significant bit (LSB) (right most bit shown as boxed in FIG. 4) can correspond to a first page of data (e.g., a lower page), the middle bit can correspond to a second page of data (e.g., a middle page), and the most significant bit (MSB) (left most bit as indicated by a diamond symbol in FIG. 3) can correspond to a third page of data (e.g., an upper page).

However, embodiments are not limited to multilevel memory cells storing three bits of data. For instance, a number of embodiments can include memory cells configured to store more or fewer than three bits of data and/or a fractional number of bits of data per cell, and embodiments are not limited to the particular encoding assigned to the data states L1 to L8.

The diagram shown in FIG. 4 illustrates threshold voltage (Vt) distributions associated with programming memory cells (e.g., NAND flash cells) in accordance with a two-pass programming process (e.g., a 4-8 two-pass programming process) that includes a first programming pass (PP_1) 427 by which the lower page and middle page (LP/MP) are programmed, and a second programming pass (PP_2) 429 by which the upper page (UP) is programmed.

Threshold voltage (Vt) distribution 421 represents erased memory cells. The first programming pass 427 includes adjusting the Vt of the memory cells (e.g., via programming pulses applied to a selected word line) to one of four levels represented by Vt distributions 432-1, 432-2, 432-3, and 432-4. The voltage levels are represented by Vt distributions, which can reflect a statistical average Vt level of cells programmed to a particular level. In this example, cells whose lower page is to store a bit value of "1" (e.g., LP=1) and whose middle page is to store a bit value of "1" (e.g., MP=1) are programmed to distribution 432-1 during the first programming pass 427, cells whose lower page is to store a bit value of "1" (e.g., LP=1) and whose middle page is to store a bit value of "0" (e.g., MP=0) are programmed to distribution 432-2 during pass 427, cells whose lower page is to store a bit value of "0" (e.g., LP=0) and whose middle page is to store a bit value of "0" (e.g., MP=0) are programmed to distribution 432-3 during pass 427, and cells whose lower page is to store a bit value of "0" (e.g., LP=0) and whose middle page is to store a bit value of "1" (e.g., MP=1) are programmed to distribution 432-4 during pass 427.

The second programming pass 429 includes adjusting the Vt of the memory cells (e.g., via programming pulses applied to a selected word line) to one of eight levels represented by Vt distributions 434-1 to 434-8, which correspond to data states L1 to L8, respectively, with each one of data states L1 to L8 indicating a different 3-bit stored bit pattern. In this example, cells programmed to data state L1 store data "111," cells programmed to data state L2 store data "011," cells programmed to data state L3 store data "001," cells programmed to data state L4 store data "101," cells programmed to data state L5 store data "100," cells programmed to data state L6 store data "000," cells programmed to data state L7 store data "010," and cells programmed to data state L8 store data "110."

The diagram illustrated in FIG. 4 illustrates a number of read voltages 490-0, 490-1, 490-2, 490-3, 490-4, 490-5, and 490-6 (referred to generally as read voltages 490) associated with reading the bits of the three respective stored pages. A number of read strobes (e.g., using a number of the read voltages 490 applied to the selected word line) may be required in association with a reading a particular page of data. For instance, in this example, the encoding is such that a single read strobe (e.g., at read voltage 490-3) can be used to determine whether the lower page of the cell is a "0" or a "1" (e.g., a single Vt detection operation using read voltage 490-3). Also, in this example, two read strobes must be performed in order to decode the middle page (e.g., one strobe at read voltage 490-1 and one strobe at read voltage 490-5). Also, in this example, the encoding is such that four read strobes must be performed in order to decode the upper page (e.g., strobes at read voltages 490-0, 490-2, 490-4, and 490-6). However, in instances in which the first programming pass 427 has been performed but the second programming pass 429 has not been performed, it can be beneficial to use different read voltages to read the lower and middle pages than those read voltages (e.g., 490) used to read the lower and middle pages when the upper page has also been programmed. For example, if it is determined that the second programming pass 429 has not been performed, reading the lower page using read voltage 422-2 can result in fewer bit errors that using read voltage 490-3.

Figure 5:
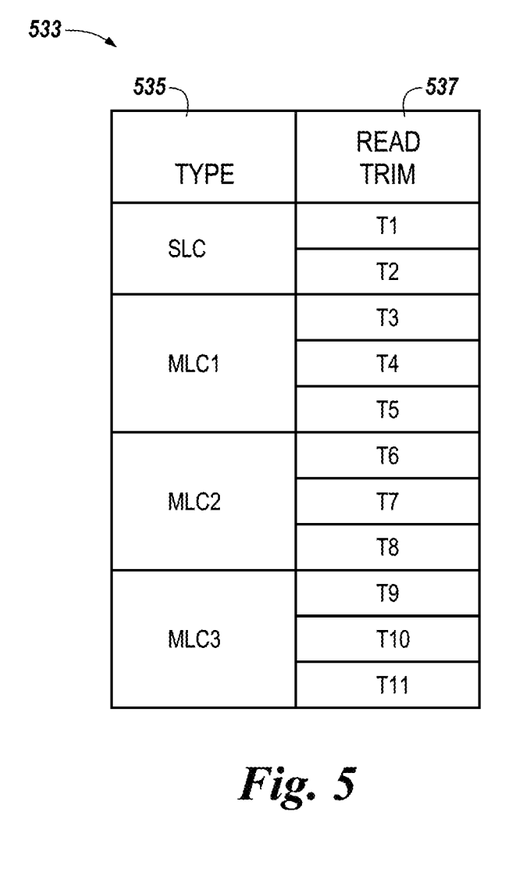
FIG. 5 illustrates a table illustrating a number of different selectable read trim sets corresponding to different programming process page mapping types in accordance with a number of embodiments of the present disclosure.

FIG. 5 illustrates a table 533 illustrating a number of different selectable read trim sets corresponding to different programming process page mapping types in accordance with a number of embodiments of the present disclosure. The table 533 is an example of trim information that can correspond to trim information 233 shown in FIG. 2. Column 551 illustrates four different programming process types, which can each have different corresponding page mappings.

For example, memory cells of memory units such as memory units 212 shown in FIG. 2 can be configured as SLC or MLC cells. The MLC configurations can be 2-bit, 3-bit, or 4-bit configurations, for instance. The page mapping (e.g., programming order of pages) can vary based on the particular MLC configuration. Additionally, the programming processes corresponding to a particular MLC can vary. For example, a 3-bit MLC configuration can be programmed in accordance with a one-pass, two-pass, or three-pass programming process. Accordingly, the read trim sets used to read a particular page can depend on the cell type (e.g., SLC or one of a number of different MLC types) as well as on the particular programming process used to program the page.

In addition, as described herein, it can be beneficial to adjust a particular trim set used to read a particular page depending on, for example, whether the particular page is a partially written page, whether the particular page is a last written page in a partially written block, and/or whether the particular page is adjacent to a last written page in a partially written block. In a number of embodiments of the present disclosure, an internal controller (e.g., 225) of a memory device (e.g., 210) can be configured to select, from among of a number of different read trim sets, an appropriate trim set for reading a particular page based on internally maintained page map information and internally maintained last written page status information.

In the example shown in FIG. 5, column 553 indicates a number of different trim sets corresponding to the respective programming process page mapping types shown in column 551. For instance, T1 can be a first trim set used to read SLCs of a last written page of a partially written block, and T2 can be a second trim set used to read SLCs of pages within a partially written block which are not the last written page or not adjacent to the last written page. T3, T4, and T5 can be trim sets used to read cells of type MLC1, which can correspond, for example, to 2-bit MLC cells programmed in accordance with a 2-4 two-pass programming process. T3 can be a first trim set used to read pages written to cells that do not store a last written page and are not adjacent to partially programmed cells storing the last written page, T4 can be a second trim set used to read pages written to cells that store the last written page and are adjacent to partially programmed cells (e.g., such that the last written page being read has experienced some interference due to programming of the adjacent cells), and T5 can be a third trim set used to read pages written to cells that store the last written page and are adjacent to unprogrammed cells (e.g., such that the last written page being read has not experienced interference due to programming of the unprogrammed adjacent cells).

T6, T7, and T8 can be trim sets used to read cells of type MLC2, which can correspond, for example, to 3-bit MLC cells programmed in accordance with a 4-8 two-pass programming process. T6 can be a first trim set used to read pages written to cells that do not store a last written page and are not adjacent to partially programmed cells storing the last written page, T7 can be a second trim set used to read pages written to cells that store the last written page and are adjacent to partially programmed cells, and T8 can be a third trim set used to read pages written to cells that store the last written page and are adjacent to unprogrammed cells. T9, T10, and T11 can be trim sets used to read cells of type MLC3, which can correspond, for example, to 3-bit MLC cells programmed in accordance with a 2-8 two-pass programming process. T9 can be a first trim set used to read pages written to cells that do not store a last written page and are not adjacent to partially programmed cells storing the last written page, T10 can be a second trim set used to read pages written to cells that store the last written page and are adjacent to partially programmed cells, and T11 can be a third trim set used to read pages written to cells that store the last written page and are adjacent to unprogrammed cells.

A number of embodiments of the present disclosure include maintaining page map information (e.g., 231) and trim information (e.g., 233) internal to a memory device (e.g., 210), which can provide various benefits. For example, the internal controller (e.g., 225) of the memory device can adapt to different programming process page mapping types without requiring reconfiguration information from an external controller (e.g., system controller 215 or a host such as host 102). For instance, since the internal controller can access page map information such as that shown in FIG. 5, the internal controller can select appropriate trims for reading partially written blocks for a variety of different cell types and/or programming process types without having to obtain additional trim settings from external sources, for instance.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
  maintaining, with an internal controller of a memory device, a status of a last written page corresponding to a partially written block and page map information;
  responsive to receiving, from a system controller external to the memory device, a read request to a page of the partially written block, determining, from the page map information and the status of the last written page, which of a number of different read trim sets to use to read the page of the partially written block corresponding to the read request;
  wherein:
    the internal controller is separate from the system controller; and
    the system controller is responsible for logical to physical address translation for the memory device and unaware of the status of the last written page corresponding to the partially written block when providing the read request to the memory device.

2. The method of claim 1, wherein providing the read request to the memory device comprises providing a block identifier and a page identifier to the memory device, and wherein the system controller is unaware that the read request corresponds to a partially written block.

3. The method of claim 1, wherein the system controller is coupled to a host via a host interface and coupled to the memory device via a device interface, and wherein the method includes:
  providing the read request to the memory device, from the system controller, responsive to a host-initiated read request corresponding to a particular logical block address;
  translating, via the system controller, the particular logical block address to a physical block address prior to providing the read request from the system controller to the memory device.

4. The method of claim 1, wherein the status of the last written page maintained internal to the memory device includes a page number corresponding to the last written page, wherein the page map information includes a programming order of pages written to the partially written block, and wherein determining which of the number of different read trim sets to use to read the page of the partially written block includes determining at least one of:
  whether memory cells to which the page is written are fully programmed; and
  a programming status of memory cells coupled to an access line adjacent to an access line to which the page is written.

5. The method of claim 1, wherein the method includes executing the read request via the internal controller of the memory device.

6. The method of claim 1, wherein the method includes the memory device performing the read of the page of the partially written block using a selected one of the different trim sets without further interaction with the system controller.

7. The method of claim 1, wherein maintaining the page map information includes maintaining page map information corresponding to a number of different programming process page mappings including at least two different two-pass programming process page mappings.

8. The method of claim 1, wherein the system controller is a solid state drive (SSD) system controller, wherein the memory device is a NAND Flash memory device including the internal controller, and wherein the method includes determining, via the internal controller, which of the number of different read trim sets to use to read the page of the partially written block corresponding to the read request.

9. An apparatus, comprising:
  a system controller; and
  a memory device including an internal controller configured to:
    maintain a status of a last written page corresponding to a partially written block and page map information; and
    responsive to receiving, from the system controller, a read request to a page of the partially written block, determine, from the page map information and the status of the last written page, which of a number of different read trim sets to use to read the page of the partially written block corresponding to the read request,
  wherein:
    the system controller is unaware of the status of the last written page corresponding to the partially written block when providing the read request to the memory device; and
    the system controller is external to the memory device and responsible for logical to physical address translation for the memory device.

10. The apparatus of claim 9, wherein the system controller is a system controller of a solid state drive and is coupled to the internal controller of the memory device via a bus.

11. The apparatus of claim 10, wherein the bus is associated with an Open NAND Flash Interface (ONFI) structure.

12. The apparatus of claim 9, wherein the system controller does not track last written page information corresponding to pages of the memory device.

13. The apparatus of claim 9, wherein the page map information includes a page programming order.

14. The apparatus of claim 13, wherein the status of the last written page includes a page number, and wherein the internal controller of the memory device is configured to determine a location of the page corresponding to the read request relative to the last written page based on the internally maintained page programming order.

15. The apparatus of claim 9, wherein the status of the last written page corresponding to the partially written block includes a page identifier and an indication as to an amount of programming of the last written page.

16. An apparatus, comprising:
  a system controller coupled to a host via a host interface and coupled to a memory device via a device interface, wherein:

the system controller is unaware of the status of the last written page corresponding to the partially written block when providing the read request to the memory device;

the system controller is external to the memory device and responsible for logical to physical address translation for the memory device;

the memory device includes a plurality of blocks configured to store pages of data and an internal controller; and the internal controller is configured to:

maintain, internal to the memory device, a status of last written pages corresponding to partially written blocks and page map information corresponding to partially written blocks; and responsive to a read request to a partially written block, select an appropriate read trim set to read a page of data corresponding to the read request based on the internally maintained status of the last written page and the internally maintained page map information corresponding to the partially written block.

17. The apparatus of claim 16, wherein the internal controller is configured to execute the read request.

18. The apparatus of claim 17, wherein the read request includes a block identifier and a page identifier, and wherein the system controller is unaware of whether the block identifier corresponds to a partially written block when sending the read request.

19. The apparatus of claim 16, wherein the page map information includes page maps corresponding to at least two different two-pass programming processes.

20. A method, comprising:

receiving, from an external controller, a write command to a memory device comprising an array of memory cells, wherein:

execution of the write command results in a block being partially written;

the external controller is unaware of the status of the last written page corresponding to the partially written block when providing the read request to the memory device; and the external controller is responsible for logical to physical address translation for the memory device;

maintaining with a controller internal to the memory device:

an indication that the block is partially written;

an indication of a last written page in the block; and page map information comprising a page programming order;

prior to a remainder of the block being written, receiving a read request from the external controller, the read request including a block identifier and a page identifier;

comparing the block identifier to the maintained indication that the block is partially written; and responsive to determining that the block identifier matches the maintained indication that the block is partially written, determining, from the page map information and the indication of the last written page maintained internal to the memory device, which of a number of different read trim sets to use to read the page corresponding to the read request.

21. The method of claim 20, wherein the indication of the last written page in the block prevents the memory device from having to receive the indication from the external controller in association with the read request.

* * * * *